United States Patent Office 3,014,907
Patented Dec. 26, 1961

3,014,907
PREPARATION OF ALKOXY TRIAZINES
Ehrenfried H. Kober, Columbus, Ohio, assignor to Olin Mathieson Chemical Corporation, a corporation of Virginia
No Drawing. Filed July 21, 1959, Ser. No. 828,461
5 Claims. (Cl. 260—248)

This invention relates to a novel method for the preparation of trichloromethyl triazines and in particular, to a method for the preparation of 2-alkoxy-4,6-bis-trichloromethyl-1,3,5-triazines and 2,4-bis - alkoxy - 6 - trichloromethyl-1,3,5-triazines.

By the process of this invention, 2-alkoxy-4,6-bis-trichloromethyl-1,3,5-triazines and 2,4-bis - alkoxy - 6 - trichloromethyl-1,3,5-triazines can be conveniently and economically prepared by reacting 2,4,6-tris-trichloromethyl-1,3,5-triazine with an alcohol, while in the presence of a tertiary amine catalyst. Useful alcohols include the aliphatic primary and secondary alcohols containing from one to eight carbon atoms, for example, methyl alcohol, ethyl alcohol, isopropyl alcohol, n-propyl alcohol, n-butyl alcohol, isoamyl alcohol, n-hexyl alcohol, or n-octyl alcohol. Suitable catalysts include the aliphatic tertiary amines for instance, trialkylamines such as trimethylamine, triethylamine, tributylamine, etc. and N-alkyl substituted cyclic amines such as N-ethyl piperidine, N-methyl morpholine, nicotine, etc.

The process of this invention is carried out by admixing the reactants in the presence of the amine catalyst. Preferably, the tris-trichloromethyl-1,3,5-triazine is mixed with an excess of the alcohol containing the amine catalyst. The temperature of this process can be varied widely from about 0° to 150° C. If replacement of only one trichloromethyl group by an alkoxy group is desired, the reaction is carried out with simultaneous cooling of the reaction flask so as to maintain the temperature of the reaction in the range of about 0° to about 30° C. If replacement of two trichloromethyl groups is desired, the reaction is carried out by maintaining the 2,4,6-tris-trichloromethyl-1,3,5-triazine, excess alcohol and the amine catalyst at a temperature of about 60° to about 150° C. and preferably at reflux temperature. The required reaction time may vary between a few minutes and several hours according to the alcohol used. The desired reaction product can easily be obtained by distilling off the amine, the excess alcohol, and the by-product chloroform formed during the reaction. In the case of the 2-alkoxy-4,6-bis-trichloromethyl-1,3,5-triazine products the distillation is preferably performed in vacuo. The yields are, in general, good to excellent. If necessary, the remaining crude product can be purified by vacuum distillation.

The valuable 2,4-bis-alkoxy-6-trichloromethyl-1,3,5-triazines can also be prepared by reacting 2-alkoxy-4,6-bis-trichloromethyl-1,3,5-triazine with an excess of alcohol and in the presence of a tertiary amine catalyst, at a temperature of from about 60° to about 150° C. and preferably at reflux temperature.

The compound, 2,4,6-tris-trichloromethyl-1,3,5-triazine, has been reacted with catalytic amounts of sodium dissolved in ethanol, for example, with one, two, or three moles of sodium in ethanol, and with alcoholic sodium hydroxide. From none of these experiments could the expected 2-ethoxy-4,6-bis-trichloromethyl - 1,3,5 - triazine or the 2,4-bis-ethoxy-6-trichloromethyl-1,3,5-triazine be isolated. The main reaction products were 2,4,6-tris-ethoxy-1,3,5-triazine and/or cyanuric acid, indicating that all three trichloromethyl groups had reacted simultaneously. It is not possible to prepare 2-alkoxy-4,6-bis-trichloromethyl-1,3,5-triazine or 2,4-bis - alkoxy - 6 - trichloromethyl-1,3,5-triazines in this manner. Surprisingly, however, it has been found that when a tertiary amine is substituted for an alkali alcoholate valuable 2-alkoxy-4,6-bis-trichloromethyl-1,3,5-triazines and 2,4-bis-alkoxy-6-trichloromethyl-1,3,5-triazines can be prepared in good yields. The trichloromethyl group in the 6-position is not attacked even when an excess of alcohol is present.

The compounds thus prepared, the 2-alkoxy-4,6-bis-trichloromethyl-1,3,5-triazines and the 2,4-bis-alkoxy-6-trichloromethyl-1,3,5-triazines, are useful as agriculturals as they possess besides insecticidal and fungicidal properties, a pronounced herbicidal activity. Especially valuable in this respect is the 2-ethoxy-4,6-bis-trichloromethyl-1,3,5-triazine, an excellent pre-emergence herbicide, which is described and claimed in pending Schroeder and Grundmann application Serial No. 678,448, filed August 15, 1957.

There is described and claimed in Schroeder and Grundmann pending appplication Serial No. 678,448, filed August 15, 1957, now U.S. Patent No. 2,951,079, a process for preparing 2-alkoxy-4,6-bis-trichloromethyl-1,3,5-triazines by the reaction of an aliphatic primary or secondary alcohol with a 2-halo-4,6-bis-trichloromethyl-1,3,5-triazine. The 2-halo-4,6-bis-trichloromethyl-1,3,5-triazines can be prepared as described and claimed in Schroeder and Grundmann United States Patent 2,880,207 by the reaction of phosphorus oxyhalides, preferably phosphorus oxychloride or oxybromide with a 2-hydroxy-4,6-bis-trichloromethyl-1,3,5-triazine amidine salt. The amidine salts can be prepared by the reaction of phosgene and haloalkyl amidines as described in Schroeder and Grundmann United States Patent 2,876,221.

Although 2-alkoxy-4,6-bis - trichloromethyl - 1,3,5 - triazines can be prepared by the sequence of reactions listed in the preceding paragraph, the process is long and tedious and the overall yields are poor compared to the overall yield of the process of this invention.

This invention is further illustrated but not limited by the following examples.

EXAMPLE I

*2-methoxy-4,6-bis-trichloromethyl-1,3,5-triazine*

A total of 40 grams of 2,4,6-tris-trichloromethyl-1,3,5-triazine was added at 0° C. to the solution of 30 grams of triethylamine in 200 milliliters of methanol. The reaction mixture was kept between 0° and 20° for seven hours. A small amount of a solid by-product was filtered off and the triethylamine, the excess methanol and the chloroform formed, were removed by vacuum distillation at a bath temperature of 20° C. A yield of 29.4 grams of 2-methoxy-4,6-bis-trichloromethyl-1,3,5-triazine, corresponding to 92 percent of the theoretical quantity, was obtained. For final purification, the oil was distilled in vacuo, yielding crystals with a melting point of 46° C.

Calcd. for $C_6H_3Cl_6N_3O$: C, 20.84; H, 0.87; N, 12.15. Found: C, 20.31; H, 0.80; N, 12.13.

EXAMPLE II

*2-ethoxy4,6-bis-trichloromethyl-1,3,5-triazine*

Triethylamine in the amount of 37.9 grams was added at 0° C. with stirring, to the solution of 43.35 grams of 2,4,6-tris-trichloromethyl-1,3,5-triazine in 750 milliliters of ethanol. The reaction mixture was kept overnight between 0° C. and room temperature. By vacuum distillation the triethylamine, the excess ethanol, and the chloroform formed were removed at a maximum bath temperature of 15° C. The oily residue (37.5 grams) was dissolved in 1000 milliliters of Skellysolve F, whereupon a small amount of a solid by-product precipitated. After filtering off the solid by-product, the Skellysolve was removed from the filtrate and the remainder distilled in vacuo, yielding 26.94 grams (82.3 percent of the theoretical quantity) of the 2-ethoxy-4,6-bis-trichloromethyl-1,3,5-triazine. The boiling point of 139–140° C./0.85 mm. Hg and the refractive index of $n_D^{23}$:1.5363 correspond to those described for an authentic sample.

EXAMPLE III

*2-butoxy-4,6-bis-trichloromethyl-1,3,5-triazine*

Triethylamine (30 grams) was added at 0° C., with stirring, to the solution of 33 grams of 2,4,6-tris-trichloromethyl-1,3,5-triazine in 200 milliliters of n-butanol. The reaction mixture was maintained overnight between 0° C. and room temperature. In the next step, the triethylamine, the excess butanol, and the chloroform formed were removed in vacuo at a maximum bath tempertaure of 20° C. The oily residue was dissolved in 250 milliliters of Skellysolve F, whereupon a small amount of a solid by-product precipitated. After filtering off the solid by-product, the Skellysolve F was removed from the filtrate and the remainder distilled in vacuo, yielding 20.1 grams (72.5 percent of the theoretical quantity) of the 2-n-butoxy-4,6-bis-trichloromethyl - 1,3,5 - triazine, colorless liquid, B.P. 136–142° C./0.4 mm. Hg; $n_D^{25.5}$: 1.5282.

Calcd. for $C_9H_9Cl_6N_3O$: C, 27.86; H, 2.34; N, 10.83; Cl, 54.84. Found: C, 27.99; H, 2.26; N, 10.89; Cl, 54.69.

EXAMPLE IV

*2-butoxy-4,6-bis-trichloromethyl-1,3,5-triazine*

A total of 30 grams of N-ethyl-piperidine was added at 0° C., with stirring, to the solution of 40 grams of 2,4,6-tris-trichloromethyl-1,3,5-triazine in 200 milliliters of n-butanol. The reaction mixture was kept for seven hours at 0° C. Excess butanol, the N-ethyl-piperidine and the chloroform formed were removed in vacuo at a maximum bath temperature of 20° C. The oily residue was dissolved in 250 milliliters of Skellysolve F, whereupon a small amount of a solid by-product precipitated. After filtering off the solid by-product, the Skellysolve was removed from the filtrate and the remainder distilled in vacuo, yielding 22.0 grams (66 percent of the theoretical quantity) of 2-butoxy-4,6-bis-trichloromethyl-1,3,5-triazine; B.P. 152–154° C./0.7 mm. Hg; $n_D^{21}$:1.5304.

EXAMPLE V

*2-isopropoxy-4,6-bis-trichloromethyl-1,3,5-triazine*

An amount of 35 grams of triethylamine was added at 0° C., with stirring, to the solution of 35 grams of 2,4,6-tris-trichloromethyl-1,3,5-triazine in 175 milliliters of isopropyl alcohol. Then the reaction mixture was maintained for six hours at 0° C. Excess isopropyl alcohol, the triethylamine, and the chloroform formed were removed by vacuum distillation at a maximum bath temperature of 20° C. The oily residue was dissolved in 150 milliliters of Skellysolve F, whereupon a small amount of a solid by-product precipitated. By filtration, this solid by-product was removed. The Skellysolve was removed from the filtrate and the remainder distilled in vacuo, yielding 25.0 grams (82.7 percent of the theoretical quantity) of 2-isopropoxy-4,6-bis-trichloromethyl-1,3,5-triazine. The boiling point of 155–158° C. (1 mm. Hg) and the refractive index of $n_D^{23}$: 1.5321 correspond to that described for an authentic sample.

EXAMPLE VI

*2,4-bis-ethoxy-6-trichloromethyl-1,3,5-triazine*

The solution of 27.0 grams of 2-ethoxy-4,6-bis-trichloromethyl-1,3,5-triazine and 31.3 grams of triethylamine in 150 milliliters of ethanol was refluxed for seven hours. Then the excess ethanol, the triethylamine, and the chloroform produced were removed by distillation. The oily residue was dissolved in 150 milliliters of Skellysolve F, whereupon a small amount of an insoluble by-product precipitated. After filtering off this insoluble by-product, the Skellysolve was distilled from the filtrate and the remainder distilled in vacuo, yielding 18.92 grams (88.2 percent of the theoretical quantity) of 2,4-bis-ethoxy-6-trichloromethyl-1,3,5-triazine; boiling point 133.5° C.–135.5° C./1.9 mm. Hg. $n_D^{26}$:1.5108.

EXAMPLE VII

*2,4-bis-ethoxy-6-trichloromethyl-1,3,5-triazine*

This compound can also be obtained directly from tris-trichloromethyl-1,3,5-triazine without isolation of the 2-ethoxy-4,6-bis-tri-chloromethyl-1,3,5-triazine. A solution of 21.7 grams of tris-trichloromethyl-1,3,5-triazine and 20 grams of triethylamine in 400 milliliters of ethanol was refluxed for eight hours. The reaction mixture was worked up as described in Example VI, yielding 11.6 grams (81.3 percent of the theoretical quantity) of the 2,4-bis-ethoxy-6-trichloromethyl - 1,3,5 - triazine; B.P. 134–135.5° C./1.9 mm. Hg; $n_D^{25}$:1.5111.

The compound 2,4-bis-ethoxy-6-trichloromethyl-1,3,5-triazine was tested as a post-emergence herbicide at 16 lb./acre. For comparison the commercial herbicide 3-(p-chlorophenyl)-1,1-dimethyl urea (CMU) was tested simultaneously at 16 lb./acre.

POST-EMERGENCE HERBICIDE TEST

| Chemical | Rate, lb./acre | Percent control-mustard |
|---|---|---|
| 2,4-bis-ethoxy-6-trichloromethyl-1,3,5-triazine | 16 | 100 |
| 3-p-chlorophenyl-1,1-dimethyl urea (CMU) | 16 | 100 |

This test showed that 2,4-bis-ethoxy-6-trichloromethyl-1,3,5-triazine is highly effective against mustard when used as a post-emergence herbicide.

For use as a post-emergence herbicide, the novel 2,4-bis-ethoxy-6-trichloromethyl-1,3,5-triazine may be suitably formulated as wettable powders or as emulsifiable concentrates. Siliceous clays or talc in finely divided form are suitable diluents for wettable powders.

A 40 percent wettable powder can be prepared having the following composition:

| Component: | Percent by weight |
|---|---|
| 2,4-bis-ethoxy-6-trichloromethyl-1,3,5-triazine | 40 |
| "Barden Clay" | 50 |
| "Igepon T–73" | 5 |
| "Marasperse N," a highly purified lignosulfonate | 5 |
| | 100 |

EXAMPLE VIII

*2,4-bis-n-butoxy-6-trichloromethyl-1,3,5-triazine*

A solution of 37.8 grams of 2-n-butoxy-4,6-bis-trichloromethyl-1,3,5-triazine and 37.5 grams of triethylamine in 150 milliliters of n-butanol was refluxed, with stirring, for seven hours. Then the triethylamine, the excess butanol and the chloroform formed were removed by distillation and the oily residue dissolved in 150 milliliters of Skellysolve F, whereupon a small amount of an insoluble by-product precipitated. After filtration to remove the insoluble material, the Skellysolve was distilled from the filtrate and the remainder distilled in vacuo, yielding 28.6 grams (88.5 percent of the theoretical quantity) of 2,4-bis-n-butoxy-6-trichloromethyl - 1,3,5 - triazine, colorless oil, B.P. 135–138.5° C./0.1 mm. Hg; $n_D^{24}$:1.5005.

What is claimed is:

1. The process of preparing triazine compounds of the formula:

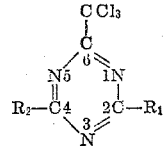

wherein $R_1$ is an alkoxy radical having from 1 to 8 carbon atoms, $R_2$ is selected from the group consisting of the —$CCl_3$ radical and an alkoxy radical having from 1 to 8 carbon atoms, which comprises reacting 2,4,6-tris-trichloromethyl-1,3,5-triazine with an alcohol selected from the group consisting of primary and secondary alcohols of the formula:

$$R_3\text{—OH}$$

wherein $R_3$ is an alkyl radical having 1 to 8 carbon atoms while in the presence of a tertiary amine catalyst selected from the group consisting of (A) trialkylamines of the formula:

$$R_3N$$

wherein R is an alkyl radical having from 1 to 5 carbon atoms, (B) cyclic amines of the formula:

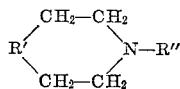

wherein R′ is selected from the group consisting of oxygen and methylene groups and wherein R″ is an alkyl group having from 1 to 5 carbon atoms and (C) nicotine at a temperature of from about 0° C. to about 150° C.

2. The process of preparing 2-methoxy-4,6-bis-trichloromethyl-1,3,5-triazine, which comprises reacting 2,4,6-tris-trichloromethyl-1,3,5 - triazine with methanol while in the presence of triethylamine and at a temperature between about 0° and about 30° C.

3. The process of preparing 2-butoxy-4,6-bis-trichloromethyl-1,3,5-triazine, which comprises reacting 2,4,6-tris-trichloromethyl-1,3,5-triazine with n-butanol while in the presence of N-ethyl-piperidine and at a temperature between about 0° and about 30° C.

4. The process of preparing 2,4-bis-ethoxy-6-trichloromethyl-1,3,5-triazine, which comprises reacting 2,4,6-tris-trichloromethyl-1,3,5-triazine with ethanol, while in the presence of triethylamine and at a temperature between about 60° and about 150° C.

5. The process of preparing 2,4-bis-ethoxy-6-trichloromethyl-1,3,5-triazine, which comprises reacting 2-ethoxy-4,6-bis-trichloromethyl-1,3,5-triazine with ethanol, while in the presence of triethylamine and at a temperature between about 60° and about 150° C.

References Cited in the file of this patent

Widdige: Journal Fur Prakt. Chemie, vol. NF 33 (part 2), pages 79 to 83 (1886).
Broche: Journal Fur Prakt. Chemie, vol. 50 (part 2), page 101, pages 108–09 (II) (1894).
Bestian et al.: Annalen der Chemie, vol. 566, pages 215 to 216 and 231 to 232 (1950).
Kreutzberger: Journ. of the Amer. Chem. Soc., vol. 79, pages 2629 to 2633 (1957).
Smolin et al.: "S-triazines and Derivatives," pages 168–169, Interscience, publishers Inc., February 1959.